Patented May 21, 1940

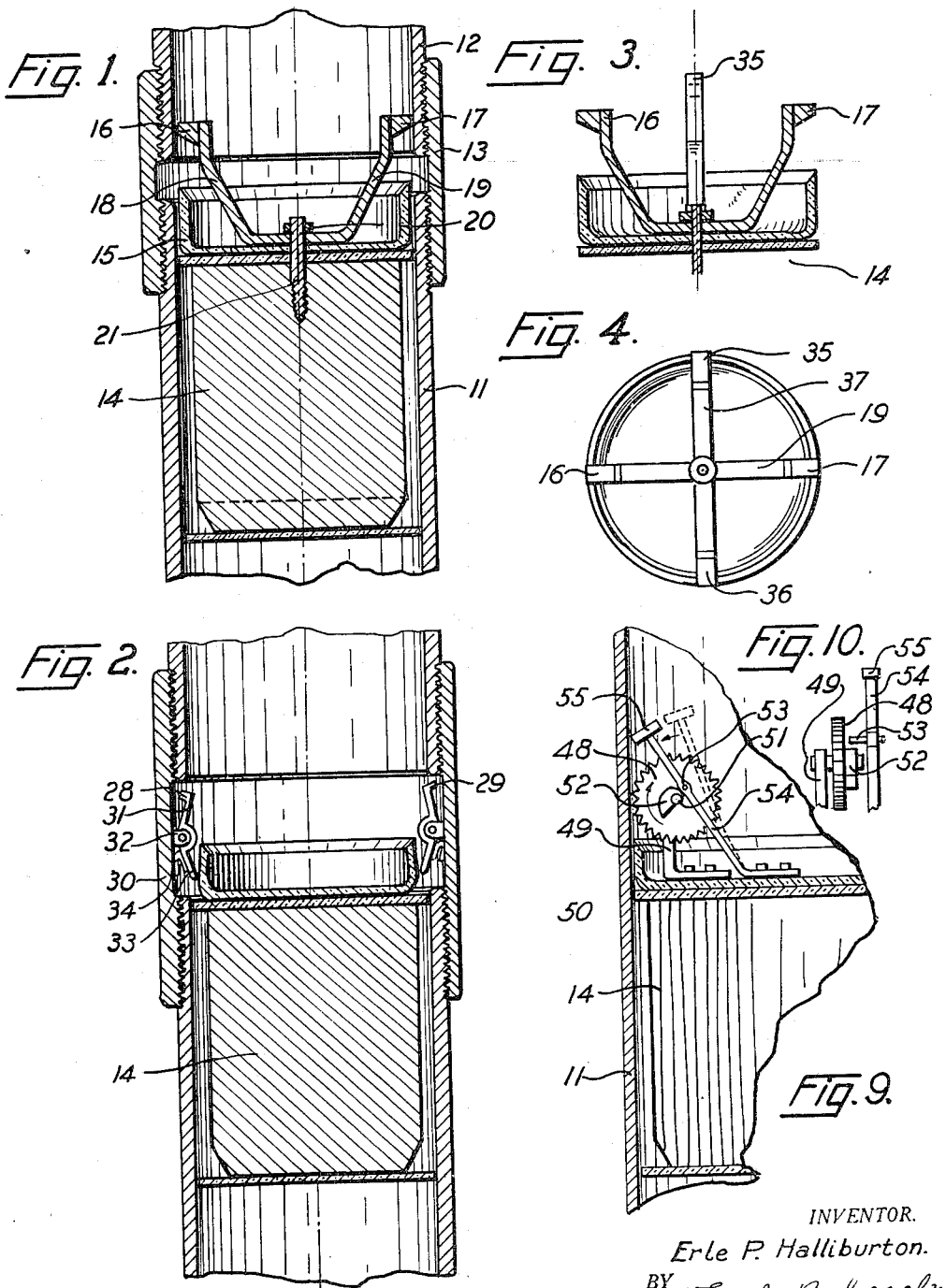

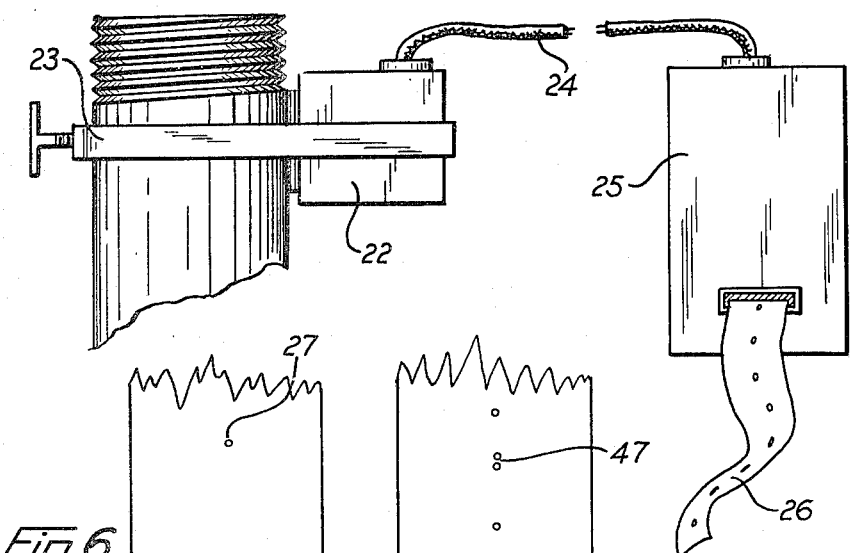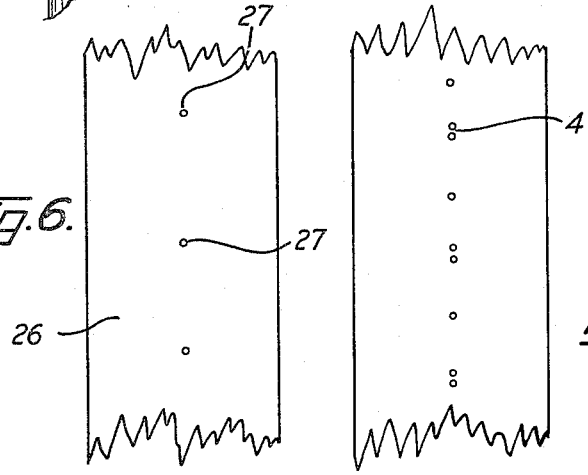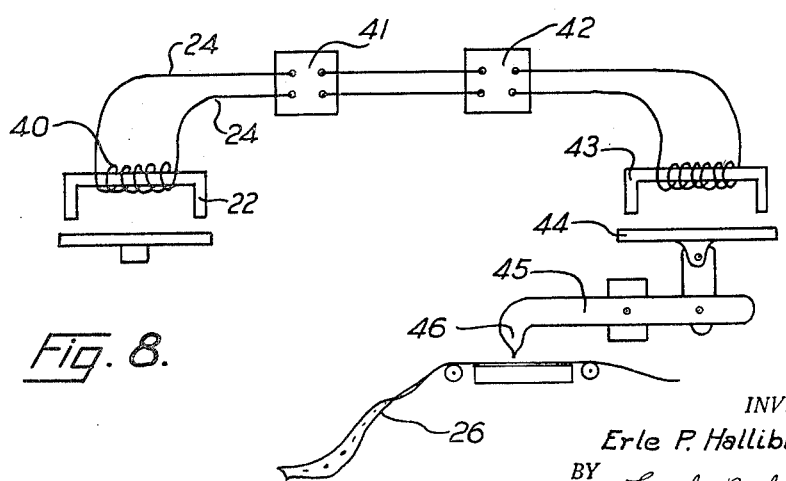

2,201,311

UNITED STATES PATENT OFFICE 2,201,311

APPARATUS FOR INDICATING THE POSITION OF DEVICES IN PIPES

Erle P. Halliburton, Los Angeles, Calif., assignor to Halliburton Oil Well Cementing Company, Duncan, Okla.

Application December 24, 1936, Serial No. 117,504

6 Claims. (Cl. 181—0.5)

This invention relates to the apparatus for indicating the position of devices passing through pipes and more particularly to means for indicating the position of the devices by the transmission of sound or vibrations through the pipes.

It is often desirable to know the position of a plug or other element moving through a pipe or casing. For example, in the cementing of an oil well where one or more plugs are used in placing the cement in a particular part of the well, it is desirable to keep track of the position of at least the upper plug. It has been common practice heretofore to use a measuring line for this purpose. Examples of means for accomplishing this are disclosed in my prior patents, No. 1,369,891, granted March 1, 1921, for Method and means for cementing oil wells, and No. 1,692,037, granted November 20, 1928, for Well sounding device.

The use of a measuring line as illustrated in the patents mentioned above has certain disadvantages. The well is subjected to high pressures during the cementing operations, so the measuring line must travel through a stuffing box or gland and this sometimes causes difficulties. Also, the measuring line sometimes breaks in the well and becomes tangled and difficult to remove. Moreover, and particularly in very deep wells, it is not always certain that the lower end of the measuring line is following the plug and the readings of distance are not always accurate because the measuring line stretches.

It is also to be noted that where a measuring line is employed in the cementing of an oil well an indication can be obtained only of the position of the upper plug.

It is an object of the present invention to overcome these and other difficulties by doing away with the measuring line altogether.

It is another object of the invention to devise an apparatus by which the position of a plug or other object in the casing of a well, or the like, can be accurately determined at all times as the result of vibrations set up in the casing.

It is still another object of the invention to devise means for determining or recording the position of a plurality of plugs or like devices within a casing.

It is still another object of the invention to devise means for indicating when a plug has arrived at a predetermined point within the casing of an oil well, or the like.

Other objects and advantages reside in certain novel features of the apparatus, as will be apparent from the following description taken in connection with the accompanying drawings, in which:

Fig. 1 is a vertical cross-sectional view of the portion of a casing with a cementing plug therein, the cementing plug having means thereon constructed in accordance with the present invention for use in determining the position of the plug.

Fig. 2 is a vertical cross-sectional view of a portion of casing and with an ordinary cementing plug therein, the casing being provided with means constructed in accordance with the present invention for indicating when the plug has reached a certain predetermined position in the casing.

Fig. 3 is a vertical cross-sectional view of the upper portion of a plug similar to that illustrated in Fig. 1, but with a modified form of sounding or vibrating device.

Fig. 4 is a plan view of the plug shown in Fig. 3.

Fig. 5 is a side view of the top of a casing in a well with apparatus constructed in accordance with the present invention secured thereto, together with a showing of the associated recording apparatus.

Fig. 6 is a plan view of a fragment of tape taken from the recorder of Fig. 5 upon which a record of the passage of one plug has been made.

Fig. 7 is a view similar to that of Fig. 6, but showing the recording of two plugs thereon.

Fig. 8 is a diagrammatic showing of the electrical connections between the detecting and recording apparatus of the invention.

Fig. 9 is a cross-sectional view of a plug with still another kind of sounding device thereon; and Fig. 10 is a side view of a portion of the apparatus of Fig. 9.

Referring to the drawings in detail, and first to the arrangement of Fig. 1, it will be seen that a portion of a jointed pipe or casing is there illustrated as consisting of two sections or stands of pipe designated 11 and 12, these being joined by a collar 13 of conventional construction. As shown, an annular space is ordinarily present just inside the collar, since the sections 11 and 12 are not in abutting relation.

Within the casing a plug 14 is located. This plug may be of the general type shown in my Patent No. 1,369,891 mentioned above, or it may be of any other suitable known construction. It is preferably provided with a suitable washer or packing element 15, at its upper end. In accordance with the present invention, the ordinary plug is modified to the extent that it is provided with one or more knockers. These may be mounted on the top of the plug as shown at 16 and 17.

The knockers should be made of metal so as to cause a distinct vibration in the casing when they strike the same. They may be mounted on the plug by means of leaf springs 18 and 19, which are so constructed as to press the knockers against the wall of the casing as the plug moves downwardly therethrough. The springs 18 and 19 may be integral and secured to the plug 14 by means of the bolt and nut 20 and 21, which also secure the washer 15 to the plug.

The arrangement is such that as the plug moves downwardly through the casing the knockers 16 and 17 will strike against the casing and make a noise or vibration therein every time the plug passes a collar 13.

In accordance with the present invention it is proposed to provide means for counting the number of times the knockers strike the casing and in this way determine how many collars or joints the plug has passed through. In this way it is possible to locate the position of the plug at any time without measuring.

Accordingly, the sound or vibration in the casing caused by the knockers 16 and 17 is transmitted to the surface of the well through the casing. It is known that a casing is a good conductor of sound or vibration, and if the knockers are so designed as to strike the casing sharply, no trouble is experienced in detecting the sound and in distinguishing it from other noises or vibrations around the oil well, especially where the detecting apparatus of the present invention is used.

It is known in seismographic geophysical exploration to pick up and record vibrations or sounds from the earth. The detectors of such seismographic apparatus usually consists of a casing which is subjected to the vibration or tremor and a bob weight or inertia element which remains substantially stationary while the casing moves. Relative movement between the casing and weight causes an armature to move with respect to the field piece or core of an electromagnet and thus the vibrations are transmuted into electrical impulses and cause a current of electricity to flow through the coil of the magnet. This current may be amplified and recorded.

A detector similar to that used in seismographic work may be used in the present invention, but the circuit is preferably modified to some extent.

In Fig. 5 the detector is illustrated at 22 and is shown clamped to the top of the casing by means of a band 23. It will be apparent that the casing of the detector 22 will be vibrated as the casing vibrates in response to the striking of the knockers 16 and 17 at various places down in the well.

As illustrated in Fig. 8, electrical impulses will be set up within a coil 40 in the detector 22 and these may be transmitted through an electrical conductor cable 24 to a recording or indicating box 25.

Now it is known that electrical impulses of comparatively low frequencies, such, for example, as the frequencies which correspond to audible sound, can be filtered to remove all impulses of other frequencies. If, therefore, a suitable filter is provided within the recording apparatus 25, as shown at 41, the recording instrument therein will receive only the impulses caused by the knockers 16 and 17 striking the casing. It is preferable also to provide some electrical amplifying circuit within the recorder 25, and this is shown at 42 in Fig. 8.

The recording apparatus, per se, may consist merely of an electro-magnet 43, the armature 44 of which is connected by link mechanism 45 to a stylus 46 adapted to strike a strip of tape 26 when the electro-magnet 43 is energized.

The recording tape 26 may be so arranged that the tape is moved and a mark made thereon every time the knockers 16 and 17 strike the casing. The mechanism for accomplishing this may be similar to that employed in stock market tickers. On the other hand, the tape may be moved at a constant rate of speed by clockwork. In either case the tape may be marked as shown in Fig. 6, as illustrated at 27, each mark indicating that the knockers 16 and 17 have struck the casing. Thus by counting the dots 27 on the tape the number of stands of casing which have been passed by the plug can be determined.

The arrangement shown in Fig. 1 and described above, is best suited for use where the casing has collars or joints and where there is a space between the bottom of one stand of casing and the top of the adjacent one. It has become common in modern casing methods to weld one stand of pipe to the next without the use of the collar, however, and the apparatus of Fig. 1 could not be successfully used in such a casing, unless the casing were specially prepared, with obstructions or the like, to actuate the knockers.

An arrangement especially suitable for use in welded casing is shown in Fig. 2. It is unnecessary in cementing operations to know the exact position of the cementing plug until, or just before, it reaches the point where it is desired to have it remain stationary. It is possible, therefore, to provide the casing with specially made collars at or near the point where it is desired that the plug shall be brought to rest. Thus, as illustrated in Fig. 2, knockers 28 and 29 are mounted in a special collar 30, rather than on a plug 14. The knockers 28 and 29 are mounted upon levers 31 pivoted to supports 32 integral with the collar 30. The levers have bell crank portions 33 adapted to contact the plug 14 and be depressed thereby into the position shown in Fig. 2 when the plug 14 is in contact therewith. Suitable leaf springs 34 are provided, tending to force the knockers 28 and 29 into contact with the collar. Thus, when the plug 14 passes a collar 30 the knockers 28 and 29 strike the collar and vibrations will be transmitted to the surface of the well just as in the arrangement of Fig. 1.

With the arrangement of Fig. 2 it may be desirable to connect several collars 30 into the casing as it is being made up so that as the plug 14 passes the upper collar a warning vibration will be transmitted to the surface and as it passes the next lower collar or collars, its exact position can be indicated.

An advantage in the arrangement of Fig. 2 over that of Fig. 1, where used in a cementing operation, is that it will be unnecessary to drill up the knockers and springs after the well is cemented and drilling operations in the well are continued.

A particular advantage of the present invention results from the fact that the position of two or more plugs within the casing can be kept track of. One way of accomplishing this is to provide for distinguishing knocks on separate plugs.

In the arrangement of Figs. 3 and 4, the knockers have been so constructed as to cause a double knock as the plug there shown passes a collar. This plug, in addition to having knockers 16 and 17 like those shown in Fig. 1, is provided with an additional pair 35 and 36 mounted upon additional springs 37 disposed at 90 degrees relation with respect to the springs 18 and 19.

The springs 37 are longer than the springs 18 and 19 so that the knockers 35 and 36 strike the casing after the knockers 16 and 17 strike the same, as the plug moves downwardly in the well. Thus a double knock is effected, which is readily detected from the single knock where only the knockers 16 and 17 are fixed to the plug.

It will be apparent therefore that where two plugs are passing downwardly within a casing, one of which is provided with a single pair of knocks, as in the arrangement of Fig. 1, and the other of which is provided with a double pair of knockers, as in the arrangement of Figs. 3 and 4, a record may be obtained upon the tape 26, as illustrated at 47 in Fig. 7, which will show the position of both plugs. By counting the double dots upon the tape the position of one plug can be determined and by counting the number of single dots on the tape, the position on the other plug can be determined.

Ordinarily, where two plugs are being passed downwardly through a casing in a cementing operation they remain a constant distance apart, but if the casing splits or if mud or fluid cement is leaking past one of the plugs they may approach each other and this will be indicated on the tape.

If an electrical magnet is used to mark the dots upon the tape in response to impulses set up in the detector 22, as illustrated in Fig. 8, it may sometimes happen that the magnet will be marking a dot upon the tape as the result of the knockers on one plug striking the casing at the same time that the knockers on another plug are transmitting an impulse. This can ordinarily be readily detected upon the tape, however, because the impulses do not remain in exact synchronism.

In Figs. 9 and 10, a modified form of sounding or knocking device is illustrated. To the top of the plug 14, a toothed wheel 48 is secured by means of the leaf spring 49, bolted to the plug by bolts 50. The shaft 51 supporting the wheel 48 carries a cam 52 which cooperates with a pin 53 carried by a leaf spring 54, the lower end of which is bolted to the plug and the upper end of which carries the knocker 55. The teeth on the wheel 48, under the influence of the spring 49, bite into the casing and effectively gear the wheel to the casing so that as the plug goes down the wheel will rotate in proportion to its movement. Thus the arrangement is such that the cam 52 will cause the knocker 55 to strike the casing once for each rotation of the wheel 48, and the movement of the plug can be kept track of, by the pick-up apparatus at the surface.

It will be apparent to those skilled in the art that instead of using a recording apparatus which marks the tape 26 in the arrangement of Fig. 5, that the tape may be previously calibrated, say with marks thereon an inch apart which will represent one section or stand of casing, and the arrangement may be such that the tape is advanced this unit distance by the apparatus for each knock made upon the casing as the plug moves.

While only a few embodiments have been shown and described herein, it is obvious that various changes may be made without departing from the spirit of the invention or the scope of the annexed claims.

I claim:

1. The combination with a jointed pipe of a device therein and apparatus for indicating the position of the device in the pipe, said apparatus comprising means for setting up a vibration in said pipe each time said device passes a joint therein, thereby producing a number of successive vibrations and means for detecting and recording the successive vibrations in the pipe to determine and record the number of joints the device has passed at any instant.

2. The combination with the casing of an oil well or the like, of a plug adapted for use in cementing the well, resilient means mounted on the plug, a knocker mounted on said resilient means and adapted to strike the casing.

3. A plug adapted for use in cementing an oil well or the like, said plug having a main body portion, a knocker and resilient means connected to the main body portion and to said knocker to mount the knocker on the plug.

4. In an oil well or the like, the combination with the casing thereof of a knocker mounted on the casing within the well, an object within the casing, means adapted to cause the knocker to strike the casing when said object passes through the casing past the knocker and means at the surface of the well for detecting the position of said object as the result of the knocker striking the casing.

5. In an oil well or the like, a casing, a knocker mounted on the casing within the well, an object in the casing, said knocker having means associated therewith and cooperating with said object to cause the knocker to strike the casing when the object passes through the casing past the knocker.

6. Apparatus adapted for use in the cementing of an oil well or the like, including a plurality of plugs adapted to pass through the casing of the well in succession and a system for indicating the position of more than one of said plugs said system including means cooperating with the plugs and casing for creating vibrations in the casing as the plugs pass certain points therein and means at the surface of the well for indicating said vibrations.

ERLE P. HALLIBURTON.